Nov. 10, 1942.                W. MILNE, JR                    2,301,437
              CLOTH DYEING, WASHING, OR BLEACHING MACHINE
                  Filed Dec. 13, 1940          2 Sheets-Sheet 1

INVENTOR
William Milne, Jr.
BY
Synnestvedt & Lehner
ATTORNEYS

Nov. 10, 1942.  W. MILNE, JR  2,301,437
CLOTH DYEING, WASHING, OR BLEACHING MACHINE
Filed Dec. 13, 1940  2 Sheets-Sheet 2
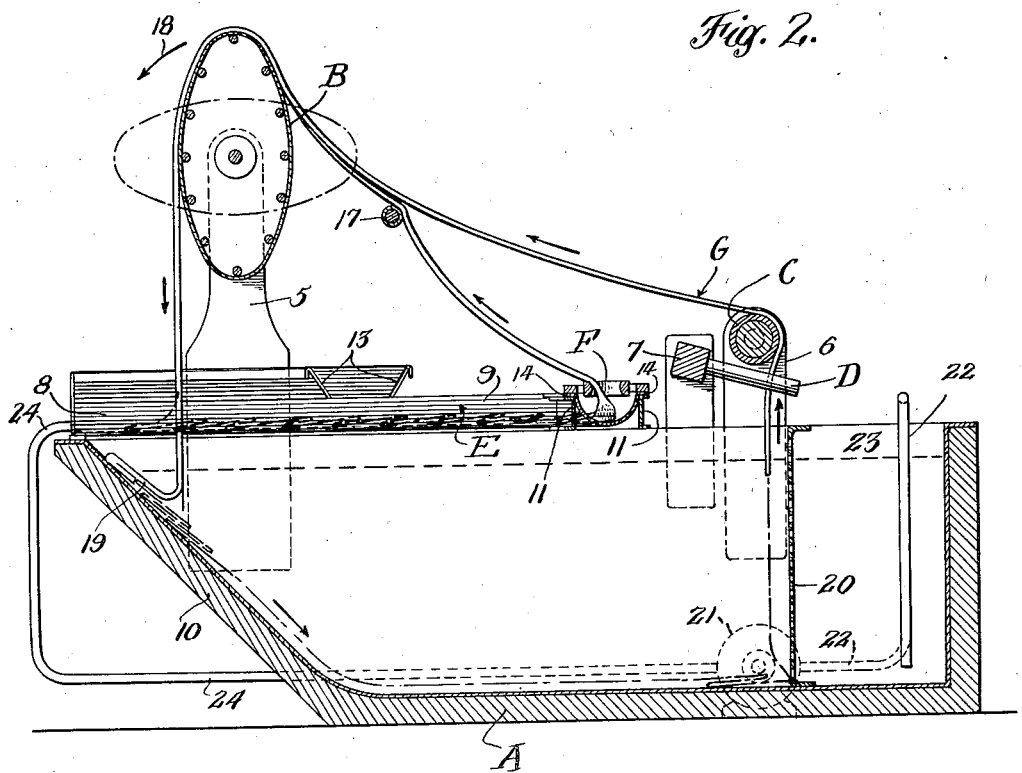
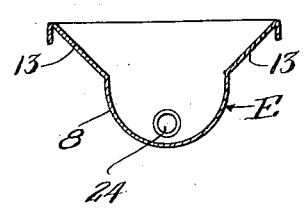
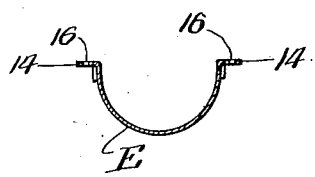
INVENTOR
William Milne, Jr.
BY
Synnestvedt + Lechner
ATTORNEYS Patented Nov. 10, 1942

2,301,437

UNITED STATES PATENT OFFICE 2,301,437

CLOTH DYEING, WASHING, OR BLEACHING MACHINE

William Milne, Jr., Silview, Newport, Del., assignor to Joseph Bancroft & Sons Co., Wilmington, Del., a corporation of Delaware Application December 13, 1940, Serial No. 369,980

3 Claims. (Cl. 68—176)

This invention relates to improvements in machines for dyeing, washing, or bleaching cloth in rope form.

The primary object of my invention is to provide a simple machine in which the cloth in endless rope form is effectively dyed, washed, or bleached, as the case may be.

How the foregoing, together with such other objects and advantages, as may hereinafter appear or are incident to my invention are realized, is illustrated in preferred form in the accompanying drawings, wherein—

Figure 2 is a cross-section taken substantially on the line 2—2 of Figure 1;

Figure 3 is a detailed cross-section taken on the line 3—3 of Figure 1; and

Figure 4 is a detailed cross-section taken on the line 4—4 of Figure 1.

Figure 1:
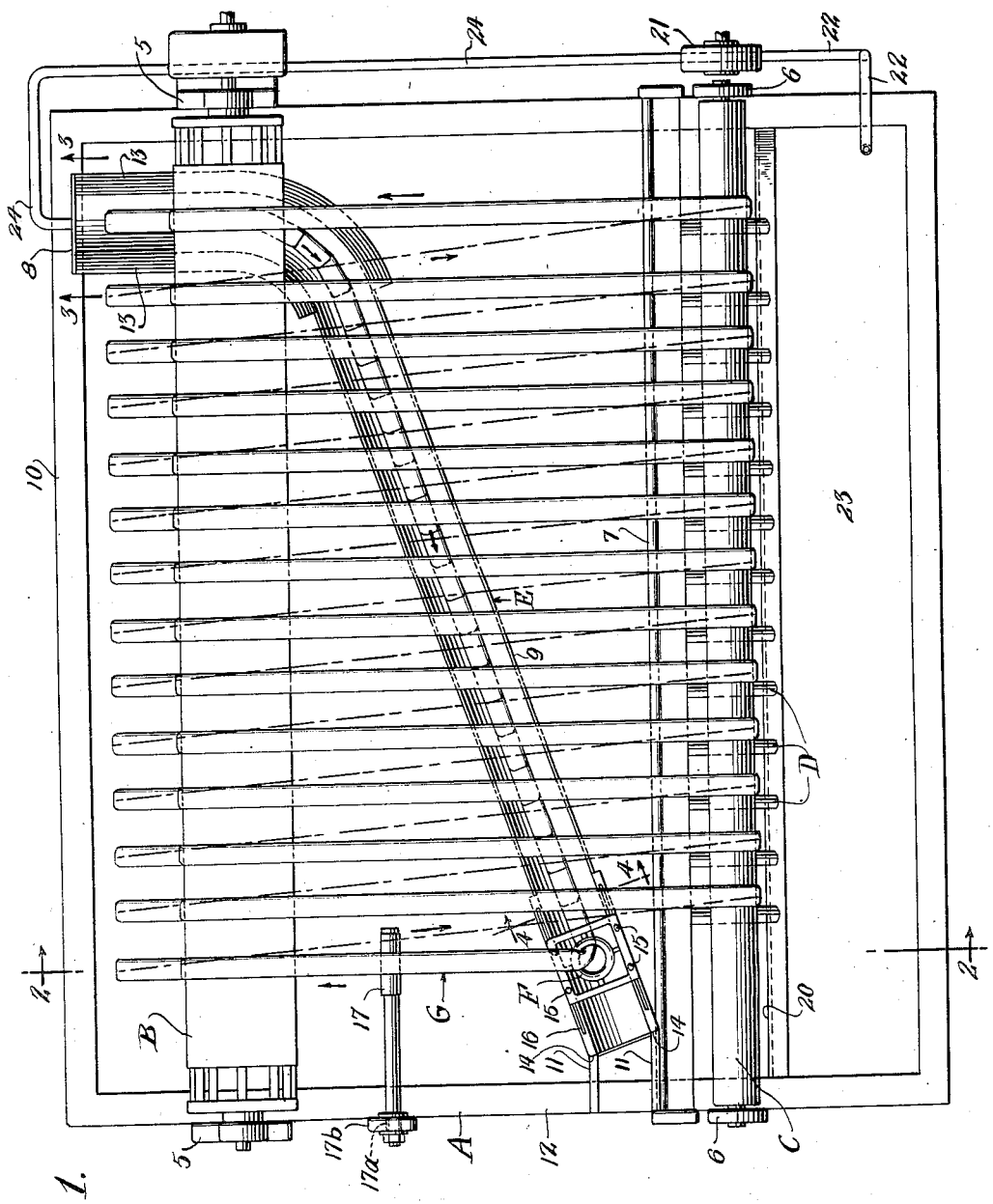
Figure 1 is a plan view of a machine embodying my improvements.

The machine comprises in general a liquor vat or beck A of rectangular form, a rotatable reel or winch B, driven by any suitable form of driving device and extending longitudinally of the vat at its rear portion and spaced some distance above the vat, end bearings 5 in which the winch is rotatably mounted, a guide roll C, extending longitudinally of the vat at its front portion and spaced slightly above the vat, end bearings 6 in which said guide roll is rotatably mounted, and guide pegs D located adjacent said guide roll and mounted on a longitudinally extending supporting bar 7 in spaced relation.

In my improved machine I provide a trough E which is located at the top of the vat A and which extends from a point below the winch B, at one end of the machine, to a point at the other end of the machine adjacent the supporting bar 7 and guide roll C. As viewed in Figure 1 the trough E has a transversely disposed portion 8 located below the winch at its right-hand end, which curves into a diagonally disposed portion 9 extending to the left-hand end of the machine and terminating at a point adjacent the supporting bar 7. The trough is supported at its right-hand end on the rear wall 10 of the vat A and its left-hand end by means of brackets 11 secured to the end wall 12 of the vat. A pot eye F is adjustably secured on the top of the trough at its left-hand end portion.

Referring to Figures 3 and 4, it will be seen that the trough E is of semi-circular form in cross-section and that it is provided with outwardly flaring upper flanges 13 at its transverse portion 8 and with upper lateral flanges 14 at its left-hand end which rest on the supporting brackets 11. The pot eye F is secured to the flanges 14 by means of bolts 15 which enter slots 16, whereby the pot eye may be adjusted in the direction of the length of the trough.

The cloth G to be dyed or otherwise treated is threaded in the machine in rope-like form and, starting from the pot eye F, it is passed upwardly over a guide member 17, then over the winch B, then downwardly into the vat A, it being noted that in this instance the winch is of oval form, and, since it is rotated in the direction of the arrow 18, it pulls the cloth upwardly from the pot eye and feeds it downwardly into the vat so that it is laid in folds therein, as indicated at 19 in Figure 2. The amount of cloth that is laid in the vat depends upon the length of cloth being handled. From the vat the cloth is passed upwardly at the front of the machine at a point adjacent the longitudinally extending vertical perforated baffle 20, then between the first pair of guide pegs D, then over the guide roll C, then upwardly and over the winch B and then downwardly into the vat again, then upwardly out of the vat, then between the next pair of guide pegs and then over the guide roll and so on in a plurality of spiral-like turns until it reaches the right-hand end of the machine.

The last turn at the right end, however, instead of being passed downwardly into the vat, is passed into the trough E and is laid therein in folds and fed along the length of the trough to its left-hand end, where it is passed upwardly through the pot eye to the point of beginning. At this point the two ends of the run of cloth are sewed together to make it endless.

Reverting to the guide member 17, it is pointed out that it is mounted for vertical adjustment in a vertical slot 17a in the bracket 17b. By means of this adjustment the angle of contact of the run of cloth from the pot eye to the winch may be adjusted.

In order to keep the cloth which is in the trough E immersed in the treating liquor in its return run I have provided pumping means comprising a pump 21, a pipe line 22 leading from the portion 23 of the vat in front of the baffle 20 to the pump, and a pipe line 24 leading from the pump into the end of the transverse portion 8 of the trough E. Thus, liquor is pumped from the vat into the trough, flows therealong with the returning cloth and overflows back into the vat. This is advantageous because the length of the run of cloth which is exposed to the atmosphere is reduced to a minimum.

It will also be seen that, since the cloth is laid from the winch directly into the trough and passes therealong with the flowing liquor to the pot eye F, the frictional drag and the pull or tension are kept at a minimum and chafe marks are avoided, whereby it is possible to handle even the more delicate fabrics without likelihood of injury thereto.

I claim:

1. A machine for the liquid treatment of cloth in endless rope form comprising a liquor vat, mechanism for continuously advancing the cloth through a generally helical path having a multiplicity of turns at least a portion of each turn of which is submerged in the treatment liquor, and mechanism for continuously returning the cloth from the output end of the helix to the input end thereof including an elongated guide disposed exteriorly of the liquor in the vat and having an extended length disposed generally axially of the helix, and means for inducing a positive flow of treatment liquor through said guide in the direction of travel of the cloth therethrough.

2. A machine for the liquid treatment of cloth in endless rope form comprising a liquor vat, mechanism for continuously advancing the cloth through a generally helical path having a multiplicity of turns at least a portion of each turn of which is submerged in the treatment liquor, and mechanism for continuously returning the cloth from the output end of the helix to the input end thereof including an elongated trough disposed exteriorly of the liquor in the vat and having an extended length disposed generally axially of the helix, and means for inducing a positive flow of treatment liquor through said trough in the direction of travel of the cloth therethrough.

3. A construction in accordance with claim 2 in which said trough is disposed at least in large part above the bath of liquor in the vat and in which said means for inducing a positive flow through the trough comprises means for introducing treatment liquor into the trough toward one end thereof to flow therethrough and to be discharged therefrom into the vat at a point remote from the inlet.

WILLIAM MILNE, Jr.